United States Patent [19]

O'Connor

[11] Patent Number: 5,026,447
[45] Date of Patent: Jun. 25, 1991

[54] METHOD FOR MAKING VARIABLE CROSS SECTION PULTRUDED THERMOPLASTIC COMPOSITE ARTICLES

[75] Inventor: James E. O'Connor, Bartlesville, Okla.

[73] Assignee: Phillips Petroleum Company, Bartlesville, Okla.

[21] Appl. No.: 308,560

[22] Filed: Feb. 10, 1989

[51] Int. Cl.$^5$ .............................................. B29C 43/22
[52] U.S. Cl. ...................... 156/166; 156/167; 156/180; 156/245; 264/250; 264/251; 264/294; 264/296
[58] Field of Search ........... 156/166, 167, 180, 244.15, 156/245; 264/250, 251, 254, 255, 280, 294, 296; 425/71, 335, 338

[56] References Cited

U.S. PATENT DOCUMENTS

| | | | |
|---|---|---|---|
| 2,300,760 | 11/1942 | Amigo | 264/296 |
| 3,714,317 | 1/1973 | Folkes | 264/294 |
| 3,740,304 | 6/1973 | Okumuro et al. | 161/175 |
| 3,862,878 | 1/1975 | Azuma | 156/244.15 |
| 3,873,399 | 3/1975 | Goldsworthy et al. | 156/441 |
| 3,901,641 | 8/1975 | Onder | 264/294 |
| 3,946,097 | 3/1976 | Takahashi et al. | 264/90 |
| 3,992,240 | 11/1976 | Kuehn, Jr. | 156/250 |
| 4,050,288 | 9/1977 | Zaikovsky et al. | 72/468 |
| 4,067,146 | 1/1978 | Mesnel | 49/495 |
| 4,194,873 | 3/1980 | Killmeyer | 425/93 |
| 4,307,053 | 12/1981 | Daws et al. | 264/165 |
| 4,381,184 | 4/1983 | Hurni et al. | 425/202 |
| 4,414,049 | 11/1983 | Jones | 156/166 |
| 4,431,600 | 2/1984 | Sakamoto et al. | 264/176 R |
| 4,462,946 | 7/1984 | Goldsworthy | 264/23 |
| 4,591,400 | 5/1986 | Fradenburgh et al. | 156/80 |
| 4,680,224 | 7/1987 | O'Connor | 428/294 |
| 4,820,366 | 4/1989 | Beever et al. | 156/166 |

OTHER PUBLICATIONS

Article entitled, "Advanced Composites: More Processing Options", Plastic Technology, Nov. 1986, pp. 13, 15 and 17.

Primary Examiner—Caleb Weston
Attorney, Agent, or Firm—Laney, Dougherty, Hessin & Beavers

[57] ABSTRACT

An article of manufacture comprises a pultruded thermoplastic composite body having at least two integral sections of different cross-sectional shapes. This is produced by a method and/or in an apparatus wherein an elongated body of reinforced thermoplastic material is pulled through a plurality of dies and the plurality of dies are operated independently of each other so that any combination of the dies can be selected to operate on the elongated body for imparting to at least a portion of the body the cross-sectional shape of the selected one or ones of the dies.

13 Claims, 2 Drawing Sheets

METHOD FOR MAKING VARIABLE CROSS SECTION PULTRUDED THERMOPLASTIC COMPOSITE ARTICLES

BACKGROUND OF THE INVENTION

This invention relates generally to thermoplastic articles of manufacture and methods and apparatus for making the same. The present invention relates more particularly, but not by way of limitation, to such an article of manufacture made of poly(arylene sulfide) with multiple integral sections of different cross-sectional shapes and to methods and apparatus for making the same in a pultrusion process.

A thermoplastic material, such as poly(arylene sulfide), is characterized by its ability to be heated or reheated, molded and cooled into a hardened state. During this process, it can be combined with a reinforcing material, such as one or more fiber strands, whereby the manufactured article is a reinforced thermoplastic composite which can be used in place of other materials, such as steel, wood or aluminum which may have inferior qualities to the reinforced thermoplastic composite.

One method of making such a composite is referred to as "pultrusion". For example, a strand of glass fibers is pulled through a source of thermoplastic material to impregnate and surround the strand of fibers with the thermoplastic material. The resultant composite is pulled through a heating, molding and cooling sequence to form a hardened article. For example, this can be a finished article ready for some end usage (such as a sucker rod used in pumping oil from an oil well) or it can be an article which is to be further used in producing a finished article.

Heretofore, there have been disclosures about forming such articles with variable cross-sectional areas. I am not aware, however, of disclosures about any such articles, or the methods and apparatus for making them, where the articles have different cross-sectional shapes integrally formed in a continuous process. Satisfying such void would provide a product which would have multiple, selected integral shapes and it would provide an efficient technique for producing it.

SUMMARY OF THE INVENTION

The present invention overcomes the above-noted and other shortcomings of the prior art by providing the novel and improved variable cross section pultruded thermoplastic composite articles and method and apparatus for making the same described herein. The present invention provides an article which has a combination of multiple cross-sectional shapes in an integrally formed body. The present invention also provides an efficient method and apparatus for making such an article in that these produce the article in a continuous process which does not need to be shut down (at least for any extended period of time) or reconstituted of different equipment.

The article of manufacture provided by the present invention comprises a pultruded thermoplastic composite body having at least two integral sections of different cross-sectional shapes.

The present invention provides a method of making a reinforced thermoplastic article, comprising the steps of: (a) pulling an elongated body of reinforced thermoplastic material through a plurality of dies; and (b) operating the plurality of dies independently of each other so that any combination of the dies can be selected to operate on the elongated body for imparting to at least a portion of the body the cross-sectional shape of the selected one or ones of the dies.

The present invention also provides an apparatus for making a reinforced thermoplastic article having different cross-sectional shapes. The apparatus comprises: a source of reinforced thermoplastic material for being pultruded from an upstream position to a downstream position; first final shaping die means for imparting a first cross-sectional shape to reinforced thermoplastic material pulled therethrough, the first final shaping die means disposed downstream of the source of reinforced thermoplastic material; second final shaping die means for imparting a second cross-sectional shape to reinforced thermoplastic material pulled therethrough, the second final shaping die means disposed downstream of the first final shaping die means; pulling means, disposed downstream of the second final shaping die means, for pulling from the source an elongated body of reinforced thermoplastic material through the first and second final shaping die means; and means for operating the first and second final shaping die means independently of each other so that any combination of the first and second final shaping die means can be selected to operate on the elongated body for imparting to at least a portion of the body the cross-sectional shape of the selected one or ones of the first and second final shaping die means.

Therefore, from the foregoing, it is a general object of the present invention to provide a novel and improved variable cross section pultruded thermoplastic composite article and method and apparatus for making the same. Other and further objects, features and advantages of the present invention will be readily apparent to those skilled in the art when the following description of the preferred embodiments is read in conjunction with the accompanying drawings.

DETAILED DESCRIPTION OF PREFERRED EMBODIMENTS

Figures 1, 2:
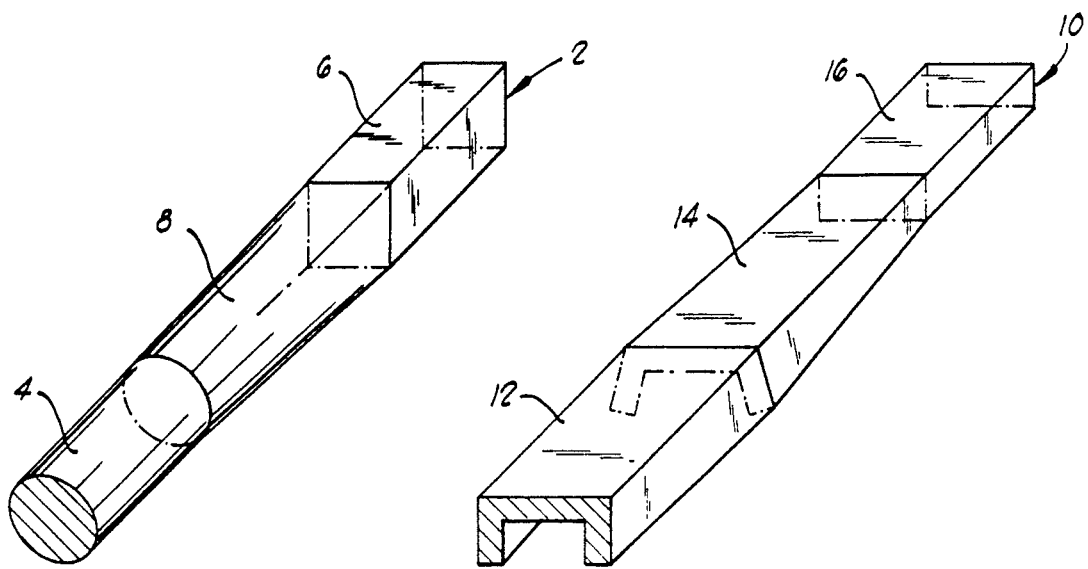
FIG. 1 is a perspective view of an article of the present invention having two integral sections of different cross-sectional shapes.
FIG. 2 is a perspective view of an article of the present invention having three sections with three different cross-sectional shapes.

The present invention provides an article of manufacture, a portion of one specific embodiment of which is illustrated in FIG. 1. The article comprises a pultruded thermoplastic composite body 2 having at least two integral sections of different cross-sectional shapes. The portion of the embodiment shown in FIG. 1 has two shaped sections. A section 4 has a round or circular cross-sectional shape, and a section 6 has a square (generically, rectangular) cross-sectional shape. A transition region 8 integrally connects the two sections 4, 6.

The body 2 is integrally formed in a manner which will be described hereinbelow, but it is noted here that the body 2 can be cut, in a known manner, to separate the section 4 from the section 6 or it can be cut so that the end cut product includes both shapes.

Illustrated in FIG. 2 is another particular embodiment of an article of manufacture of the present invention. The article shown in FIG. 2 has a body 10 in which three different cross-sectional shapes are formed. Each of these is embodied in a respective section 12, 14, 16 integrally connected in linear fashion as shown in FIG. 2.

It is to be noted that the types of shapes and numbers of shapes illustrated in FIGS. 1 and 2 are not limiting of the present invention. That is, the present invention is not limited to any particular types and numbers of shapes within a particular article of manufacture of the present invention.

As is apparent from the illustrations shown in FIGS. 1 and 2, the article of manufacture of the present invention is preferably an integrally formed elongated body. More particularly, such body has a plurality of reinforcing fibers, typically formed in one or more strands, impregnated with a thermoplastic polymer. The reinforcing fibers may be of any suitable type, but are typically or preferably glass, carbon, or aramid fibers or hybrids of them. The thermoplastic polymer is also of any suitable type which can be formed in the manner described herein. The thermoplastic polymer in the preferred embodiments is a poly(arylene sulfide) matrix, such as poly(phenylene sulfide).

The preferred embodiment body made of such material includes at least two different cross-sectional shapes as referred to hereinabove. In general, these cross-sectional shapes are of different types rather than simply of different cross-sectional areas. That is, the present invention contemplates different cross-sectional shapes as opposed to different sizes of cross sections of the same shape. With regards to the concept of the present invention, whether the cross-sectional areas of the different shapes are different or the same is immaterial; rather, what is material is that the cross-sectional shapes are different. More particularly, a body of an article of manufacture of the preferred embodiment of the present invention will have at least two generic cross-sectional shapes. In a preferred embodiment, one of these cross-sectional shapes is formed by pultruding reinforcing fibers impregnated with thermoplastic polymer through a plurality of sequentially disposed dies, and another of the cross-sectional shapes is formed by pultruding the reinforcing fibers impregnated with thermoplastic polymer through at least one less than the plurality of sequentially disposed dies. For example, with reference to the embodiment shown in FIG. 1, the body 2 could first be pulled through two dies, an upstream one imparting the square cross-sectional shape of the section 6 and a downstream one forming the circular cross-sectional shape 4 out of a portion of the body 2 which had previously passed through the upstream die. This would make the section 4 at the leading end of the body 2. At a selected time, the downstream, circular cross-sectional die would be opened or otherwise removed from acting on the body 2 so that thereafter only the square cross-sectional shaping die acts on the body 2, thereby creating the transition region 8 and the trailing, square cross-sectional section 6. This technique will be more fully described hereinbelow after first describing the apparatus represented in FIGS. 3–5.

Figure 3:
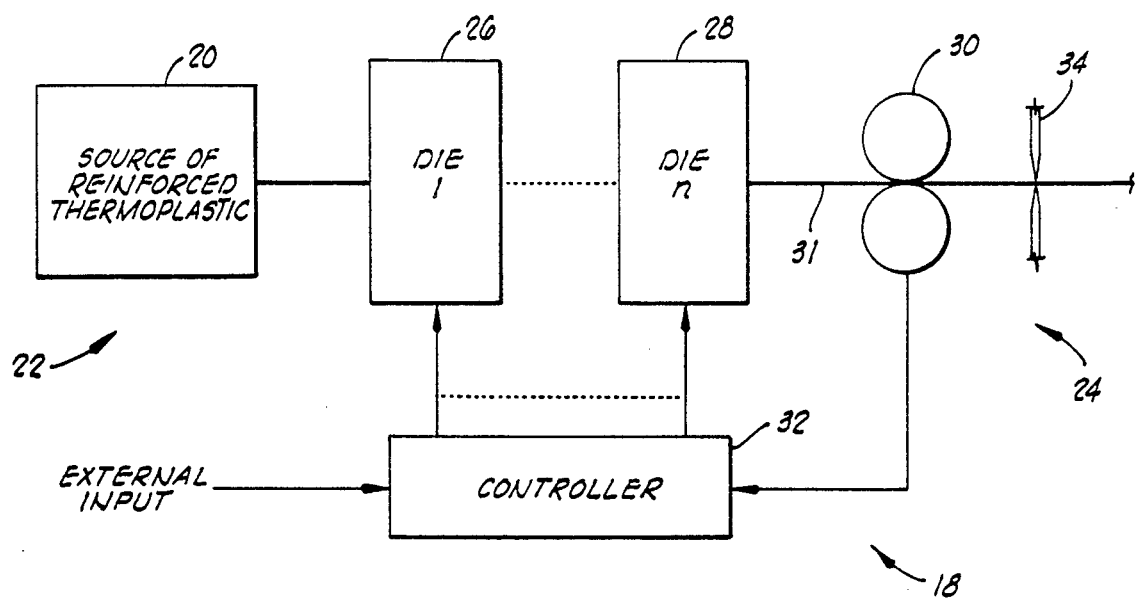
FIG. 3 is a block diagram of a preferred embodiment of an apparatus of the present invention for making an article of the present invention.

Depicted in FIG. 3 is an apparatus 18 for making a reinforced thermoplastic article having different cross-sectional shapes. The apparatus includes a source 20 of reinforced thermoplastic material for being pultruded from an upstream position 22 to a downstream position 24. The apparatus 18 also includes a final shaping die means 26 for imparting a first cross-sectional shape to reinforced thermoplastic material pulled therethrough. The apparatus also includes a final shaping die means 28 for imparting a second cross-sectional shape to reinforced thermoplastic material pulled therethrough. In general, the apparatus 18 includes a plurality, n, of known type of dies as the die means so that n cross-sectional shapes can be imparted to the article made by the apparatus 18. The specific number of dies and the specific shapes imparted thereby determine the final cross-sectional profile of the pultruded structure. The n dies are positioned relative to each other for sequentially or serially processing the continuous pull of material from the source 20. As represented in FIG. 3, the die 26 is upstream of the die 28, and the die 28 is thus downstream of the die 26.

Each of the n dies is of a suitable type, such as a fixed aperture hydraulic die of a type as known to the art, for forming the desired respective cross-sectional area as a finished shape in the pultruded article, and thus the dies may be referred to as final shaping dies as opposed to some type of pre-shaping or pre-forming die. One type of each such die may have two die members or mechanisms: one a heated die mechanism and the other a cooling die mechanism. The heated portion would heat the thermoplastic to a temperature which permits the thermoplastic to be shaped by the pressure of the die [for example, a suitable heated die would heat poly(phenylene sulfide) to a temperature within the range of about 325° C. to about 375° C.]. The cooling portion would typically be activated only for the die which imparts a selected final shape because the cooling is used for hardening the thermoplastic in a finished shape. Each of the n dies (and the individual dies thereof, if more than one) can be independently operated to close or open, or otherwise be made to act on the pultruded material or not to act thereon, for imparting or not imparting a respective shape to the thermoplastic material as desired.

The apparatus 18 represented in FIG. 3 also includes pulling means 30, disposed downstream of the dies, for pulling from the source 20 an elongated body 31 of reinforced thermoplastic material through the dies. This elongated body is, at the location of the pulling means 30 shown in FIG. 3, an article of manufacture of the present invention. The pulling means 30 is of a conventional type known to the art.

The apparatus 18 further comprises means for operating the dies independently of each other so that any combination of the dies can be selected to operate on the elongated body for imparting to at least a portion of the body the cross-sectional shape of the selected one or ones of the dies. This means for operating is represented in FIG. 3 as a controller 32. The controller 32 includes any suitable means for operating the dies as desired. For example, the controller 32 can be embodied by a suitably programmed computer or it can be a simpler device such as a counter, but in any event it can be a conventional type of device operable in a known manner in response to a desired input. As illustrated in FIG. 3, the controller 32 simply operates from either a signal from the pulling means 30 or from an external input.

The signal from the pulling means 30 represents a measurement or distance of how much material has been pultruded. The controller 32 can be set to respond at preselected measurements to open or close selected dies whenever predetermined lengths of the material have been pultruded. If each die includes multiple portions, such as a heating die and a cooling die, the controller 32 can be set to control each independently of the other as needed. Alternatively, the controller 32 can operate in response to external inputs, such as from a human operator who desires to directly and immediately control the dies.

The apparatus 18 also comprises cutting means 34 for cutting the pultruded body to produce discrete segments having either a single cross-sectional shape or multiple integral cross-sectional shapes. The cutting means 34 is of a suitable type known to the art.

Each of the aforementioned components of the apparatus 18 represented in FIG. 3 is individually of a conventional type so that more detailed descriptions thereof will not be given except to briefly describe two preferred embodiments of the source 20. These are shown in FIGS. 4 and 5.

Figure 4:
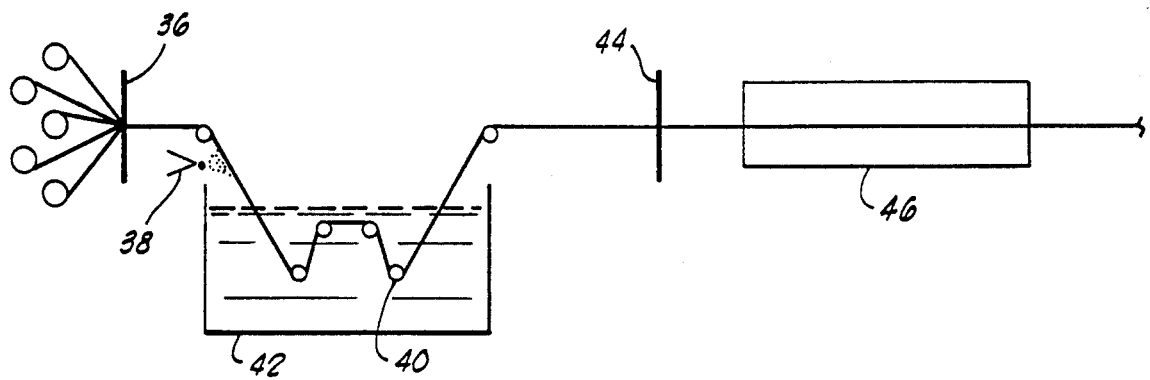
FIG. 4 is a block and schematic diagram of a preferred embodiment of the source of reinforced thermoplastic material identified in FIG. 3.

One type of source 20 is shown in FIG. 4. This is the type which starts with one or more fiber strands and impregnates and fixes the one or more strands in a poly-(arylene sulfide) matrix. One or more strands are passed through a roving guide 36 and optionally past a spray nozzle 38 through which a flow of gaseous fluid is emitted into contact with the strand material with sufficient velocity to spread an individual strand so that single filaments or bundles of single filaments are separated, thereby providing space therebetween so that subsequent contact with polymer slurry can be more effective. Each strand is passed around several redirect bars 40 which cause the spreading of the fiber strands in a bath 42 containing poly(arylene sulfide) slurry so that the individual filaments have better contact with the polymer slurry. Alternatively, the contact is with a dry powder of the thermoplastic material. Impregnated fiber strands are then pulled through a guide mechanism 44 for alignment for passage through a heated drying chamber 46 which removes the slurry medium leaving a dry strand impregnated with polymer which is then pulled through the plurality of dies including the dies 26, 28. This is the type of source more fully described in U.S. Pat. No. 4,680,224 issued July 14, 1987 and incorporated herein by reference.

Figure 5:
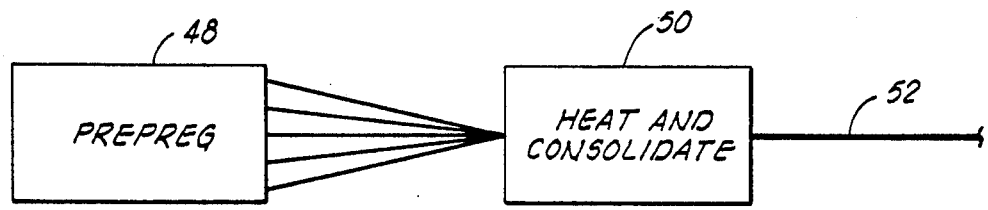
FIG. 5 is a block diagram of another preferred embodiment of the source of reinforced thermoplastic material identified in FIG. 3.

Another embodiment of the source 20 is shown in FIG. 5. This embodiment starts with one or more tapes or other forms of prepreg material, which is material that has already been formed into a reinforced thermoplastic composite. This material is pulled through a heating and consolidating means 50 which heats the individual components of prepreg and consolidates them into a single unified body 52 exiting the means 50. As with the components shown in FIG. 4, the components of FIG. 5 are of conventional types known to the art. The prepreg shown in FIG. 5 is, in a preferred embodiment, a poly(arylene sulfide) prepreg.

The apparatus 18 can be used in performing the method of the present invention, which method is generally for making a reinforced thermoplastic article. This method broadly comprises the steps of: (a) pulling an elongated body of reinforced thermoplastic material through a plurality of dies; and (b) operating the plurality of dies independently of each other so that any combination of the dies can be selected to operate on the elongated body for imparting to at least a portion of the body the cross-sectional shape of the selected one or ones of the dies. The method of the present invention, by which a length of a thermoplastic product with different cross-sectional shapes is made in a pultrusion process, comprises in a preferred embodiment the steps of (a) forming the length of the thermoplastic product to have a first cross-sectional shape; (b) converting at least a portion of the length of the thermoplastic product having the first cross-sectional shape to have a second cross-sectional shape; and (c) stopping step (b) while continuing step (a) so that one section of the length of the thermoplastic product has the second cross-sectional shape and a trailing section of the length of the thermoplastic product has the first cross-sectional shape. With reference to the apparatus 18 shown in FIG. 3, the first cross-sectional shape is formed by pulling the continuous reinforced thermoplastic material from the source 20 through the die 26, and then step (b) is performed by continuing to pull the reinforced thermoplastic material through the die 28. If the process or method were stopped at this point, it would be apparent that the portion of the pultruded article at the outlet of the die 28 would have one cross-sectional shape (e.g., a circular cross-sectional shape shown in FIG. 1), and the portion of the pultruded article at the outlet of the die 26 would have another cross-sectional shape (e.g., the square cross-sectional shape shown in FIG. 1). That is, each of the sections at the outlets of the individual dies has cross-sectional shapes the same as the corresponding shapes of the dies if each of the dies is operating on the pultruded body.

As long as the method is continued with at least the downstream-most die operating on the pultruded material, the article pulled through the pulling means 30 towards the cutting means 34 will have the shape imparted by the downstream-most die. This, however, is not all that is done in the present invention which further calls for the step (c) referred to hereinabove. That is, one or more of the downstream-most dies is stopped (typically by opening the die) from acting on the pultruded material while at least one remaining die continues to, or is then activated to, work on the pultruded body. With reference to the apparatus 18 shown in FIG. 3, the die 28 is opened, and the reinforced thermoplastic material from the source 20 is pulled through the closed or operating die 26 so that the resultant reinforced thermoplastic material passing through the pulling means 30 has integrally formed to the portion thereof having the cross-sectional shape imparted by the die 28, a portion having a cross-sectional shape imparted by the die 26 whereby a continuous reinforced thermoplastic article of variable cross-sectional shapes is formed in a continuous pultrusion process.

A more general definition of the method of the present invention includes: (a) pulling a continuous reinforced thermoplastic material through a first die having a first cross-sectional shape, wherein the first die is closed so that the reinforced thermoplastic material at an outlet of the first die has a cross-sectional shape the same as the first cross-sectional shape; and (b) opening the first die and pulling the reinforced thermoplastic material through a second die having a second cross-sectional shape, wherein the second die is closed so that the reinforced thermoplastic material has integrally formed to the portion thereof having the cross-sectional shape the same as the first cross-sectional shape a portion having a cross-sectional shape the same as the second cross-sectional shape whereby a continuous reinforced thermoplastic article of variable cross-sectional shape is formed. With reference to the apparatus depicted in FIG. 3, the "first die" referred to here could be either the die 26 or the die 28 and the "second die" could be the other. Thus, this definition covers making the article with either an upstream or a downstream shape leading and the other trailing. That is, with reference to FIG. 1, this method covers making the article as shown or, alternatively, with the section 6 leading and the section 4 trailing. Thus, a downstream die need not always convert an upstream shape. For example, the die 26 could alone be made to operate on the thermoplastic material and then the die 28 could alone be made to operate on the thermoplastic material or vice versa. This is not, of course, limited to only two dies.

With respect to the use of a plurality, n, of dies, a preferred embodiment of the method of the present invention for forming a continuous reinforced thermoplastic article of variable cross-sectional area can be stated to comprise: (a) pulling a continuous body of reinforced thermoplastic material through a plurality, n, of dies, each die having a respective cross-sectional shape wherein the nth die is the last one through which the body of reinforced thermoplastic material is pulled; (b) simultaneously forming with the n dies different portions of the body of reinforced thermoplastic material to have the respective cross-sectional shape of each of the dies, wherein the leading end of the body of reinforced thermoplastic material has the shape formed by the nth die; and (c) stopping at least the nth die from acting on the body of reinforced thermoplastic material so that the leading end of the body then has a foremost segment with a cross-sectional shape formed by the nth die and an integral trailing segment of a different cross-sectional shape. If n were three, for example, an embodiment such as that shown in FIG. 2 would be produced if the three dies imparted the shapes illustrated in FIG. 2. The downstream-most die would have the cross-sectional shape for imparting the shape which the section 12 has, the intermediate die would impart the shape which the section 14 has, and the upstream-most die would impart the cross-sectional shape which the section 16 has. To form the body 10 shown in FIG. 2, at least the downstream-most die would initially operate on the pultruded material. This downstream-most die would then be removed from operating on the pultruded material, but at least the intermediate die would then operate on the pultruded material. Finally, the intermediate die would be operated to cease acting on the pultruded material, and only the upstream-most die would operate on it. This would produce the portion of the body 10 shown in FIG. 2; however, it is to be noted that such three dies could be used in other combinations to produce the cross-sectional shapes in other orders from that shown in FIG. 2.

Preferred embodiments of the method of the present invention further comprise steps corresponding to the different ways of forming the reinforced thermoplastic material represented by the components shown in FIGS. 4 and 5. That is, preferred embodiments of the method include the step of forming the reinforced thermoplastic material, which is pulled through the dies, in either of the two manners which would be performed by utilizing the equipment shown in FIGS. 4 and 5. The method implemented by the FIG. 4 embodiment includes combining a fiber strand with a poly(arylene sulfide) matrix in one preferred embodiment, and the embodiment shown in FIG. 5 performs the step of forming the reinforced thermoplastic material by heating and consolidating a plurality of prepreg members which preferably include fiber reinforced poly(arylene sulfide).

A preferred embodiment further comprises the step of cutting the continuous reinforced thermoplastic article into pieces having one or more selected cross-sectional shapes. This is implemented in the apparatus 18 depicted in FIG. 3 by the cutting means 34.

Thus, with the present invention it is possible to pultrude a thermoplastic composite structure that has varying cross-sectional shapes. Because of the reforming of the material during the methodology and in the apparatus of the present invention described hereinabove, the present invention is particularly suitable for thermoplastic materials as opposed to thermoset materials which cannot be so reformed. The present invention allows facile changes of cross-sectional shapes within an integrally pultruded article which meets the needs referred to hereinabove. Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. A method of making a length of a thermoplastic product with different cross-sectional shapes in a pultrusion process, comprising the steps of:
    (a) forming the length of the thermoplastic product to have a first cross-sectional shape;
    (b) converting at least a portion of the length of the thermoplastic product having the first cross-sectional shape to have a second cross-sectional shape; and
    (c) stopping said step (b) while continuing said step (a) so that one section of the length of the thermoplastic product has the second cross-sectional shape and a trailing section of the length of the thermoplastic product has the first cross-sectional shape.

2. A method as defined in claim 1, further comprising the step of cutting the length of the thermoplastic product into pieces having one or more selected cross-sectional shapes.

3. A method as defined in claim 1, further comprising the step of forming the length of the thermoplastic product to have a fiber strand in a poly(arylene sulfide) matrix.

4. A method as defined in claim 1, further comprising the step of forming the length of the thermoplastic product from a poly(arylene sulfide) prepreg.

5. A method of forming a continuous reinforced thermoplastic article of variable cross-sectional shape, comprising the steps of:
    (a) pulling a continuous reinforced thermoplastic material sequentially through at least two closed dies wherein a first die has a first cross-sectional shape and a second die has a second cross-sectional shape so that the reinforced thermoplastic material at an outlet of the second die has a cross-sectional shape the same as said second cross-sectional shape; and (b) opening the second die and continuing to pull the reinforced thermoplastic material through the closed first die so that the reinforced thermoplastic material has integrally formed to the portion thereof having the cross-sectional shape the same as said second cross-sectional shape a portion having a cross-sectional shape the same as said first cross-sectional shape whereby a continuous reinforced thermoplastic article of variable cross-sectional shape is formed.

6. A method as defined in claim 5, further comprising the step of cutting the continuous reinforced plastic article into pieces having one or more selected cross-sectional shapes.

7. A method as defined in claim 5, further comprising the step of forming the reinforced thermoplastic material, including combining a fiber strand with a poly(arylene sulfide) matrix.

8. A method as defined in claim 5, further comprising the step of forming the reinforced thermoplastic material, including heating and consolidating a plurality of prepreg members.

9. A method of forming a continuous reinforced thermoplastic article of variable cross-sectional shape, comprising the steps of:
  (a) pulling a continuous body of reinforced thermoplastic material through a plurality, n, of dies, each die having a respective cross-sectional shape wherein the nth die is the last one through which the body of reinforced thermoplastic material is pulled;
  (b) simultaneously forming with the n dies different portions of the body of reinforced thermoplastic material to have the respective cross-sectional shape of each of the dies, wherein the leading end of the body of reinforced thermoplastic material has the shape formed by the nth die; and
  (c) stopping at least the nth die from acting on the body of reinforced thermoplastic material so that the leading end of the body then has a foremost segment with a cross-sectional shape formed by the nth die and an integral trailing segment of a different cross-sectional shape.

10. A method as defined in claim 9, further comprising the step of cutting the continuous reinforced plastic article into pieces having one or more selected cross-sectional shapes.

11. A method as defined in claim 9, further comprising the step of forming the body of reinforced thermoplastic material, including combining a fiber strand with a poly (arylene sulfide) matrix.

12. A method as defined in claim 9, further comprising the step of forming the body of reinforced thermoplastic material, including heating and consolidating a plurality of prepreg members.

13. A method of forming a continuous reinforced thermoplastic article of variable cross-sectional shape, comprising the steps of:
  (a) pulling a first portion of a continuous reinforced thermoplastic material through a first die having a first cross-sectional shape, wherein the first die is closed so that the reinforced thermoplastic material at an outlet of the first die has a cross-sectional shape the same as said first cross-sectional shape; and
  (b) opening the first die and pulling a second portion of the reinforced thermoplastic material through a second die having a second cross-sectional shape, wherein the second die is closed so that the reinforced thermoplastic material has integrally formed to the first portion thereof having the cross-sectional shape the same as said first cross-sectional shape the second portion having a cross-sectional shape the same as said second cross-sectional shape whereby a continuous reinforced thermoplastic article of variable cross-sectional shape is formed.

* * * * *